(12) United States Patent
Bankoski et al.

(10) Patent No.: US 8,594,189 B1
(45) Date of Patent: Nov. 26, 2013

(54) APPARATUS AND METHOD FOR CODING VIDEO USING CONSISTENT REGIONS AND RESOLUTION SCALING

(75) Inventors: James Bankoski, Los Gatos, CA (US); Paul Wilkins, Cambridge (GB); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 13/081,672

(22) Filed: Apr. 7, 2011

(51) Int. Cl.
*H04N 11/02* (2006.01)

(52) U.S. Cl.
USPC .................................................... 375/240.03

(58) Field of Classification Search
USPC .............................. 375/240.01–29
See application file for complete search history.

(56) References Cited

U.S. PATENT DOCUMENTS

| | | | | |
|---|---|---|---|---|
| 5,561,475 | A * | 10/1996 | Jung | 348/699 |
| 5,596,370 | A * | 1/1997 | Jung | 375/240.16 |
| 8,116,374 | B2 * | 2/2012 | Gordon et al. | 375/240.12 |
| 2007/0115156 | A1 * | 5/2007 | Lim et al. | 341/67 |
| 2008/0008398 | A1 * | 1/2008 | Tanaka et al. | 382/275 |
| 2009/0103617 | A1 * | 4/2009 | Au et al. | 375/240.13 |
| 2010/0278271 | A1 * | 11/2010 | MacInnis | 375/240.18 |
| 2010/0328538 | A1 * | 12/2010 | Al-Kadi et al. | 348/699 |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated. Oct. 29, 2007.

"Series H: Audiovisual and Multimedia Systems; Infrastructure of audiovisual services—Coding of moving video". H.264. Advanced video coding for generic audiovisiual services. Version 8. International Telecommunication Union. Dated Nov. 1, 2007.

(Continued)

*Primary Examiner* — David Czekaj
*Assistant Examiner* — Leron Beck
(74) *Attorney, Agent, or Firm* — Young Basile Hanlon & MacFarlane P.C.

(57) ABSTRACT

An apparatus and method for encoding and decoding a video signal having a plurality of frames is disclosed. The encoding method subdivides at least one frame of the plurality of frames into a plurality of regions where each region is composed of different numbers of blocks based on their data consistency. Each region is encoded using residual having a common size. In this way, different parts of the image may be encoded at different resolutions.

20 Claims, 9 Drawing Sheets

(56) References Cited

OTHER PUBLICATIONS

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

\* cited by examiner

APPARATUS AND METHOD FOR CODING VIDEO USING CONSISTENT REGIONS AND RESOLUTION SCALING

TECHNICAL FIELD

The present invention relates in general to video encoding and decoding.

BACKGROUND

An increasing number of applications today make use of digital video signals for various purposes including, for example, business meetings between people in remote locations via video conferencing, high definition video entertainment, video advertisements, and sharing of user-generated videos. As technology is evolving, users have higher expectations for video quality and resolution even when video signals are transmitted over communications channels having limited bandwidth.

To realize transmission of higher quality video while limiting bandwidth consumption, a number of video compression schemes have been developed—including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10). These schemes may denote each image of a video as a frame, and subdivide each frame into groups of pixels called macroblocks or blocks.

These compression schemes may use prediction techniques to minimize the amount of data required to transmit video signals by using, for example, the spatial and temporal coherences in video information. Prediction techniques can allow for multiple past transmitted frames and future frames to be used as potential reference frame predictors for macroblocks in a frame.

A video stream encoded by these compression schemes will have frames with a constant pixel resolution. Pixel resolution is the number of pixels in a frame as measured by the number of pixel rows and columns. Some compression schemes have the ability to reduce the pixel resolution (down-scaling) of each frame before encoding to facilitate more efficient encoding. In such a compression scheme, the decoder will increase the pixel resolution (upscaling) of each frame in the decoded image so that frames in the final decoded video will have the same pixel resolution as the original frames. For example, a video stream having frames with a pixel resolution of 800×600 could be down-sampled to a pixel resolution of 400×300, encoded at a pixel resolution of 400×300, and then up-sampled back to 800×600 after decoding.

SUMMARY

Embodiments of an apparatus and a method for encoding a video signal having at least one frame with a plurality of blocks having pixels are disclosed herein. In one embodiment, the method includes subdividing at least one frame of the plurality of frames into a plurality of regions using a processor, each region composed of a contiguous plurality of blocks, and each region having a pre-determined level of inter-block data consistency. The method also includes determining a predictor for each region and encoding each region using its predictor by scaling to a predetermined scaled size.

In another embodiment, the apparatus includes a memory and a processor. The processor is configured to execute instructions stored in the memory to subdivide at least one frame of the plurality of frames into a plurality of regions, each region composed of a contiguous plurality of blocks, and each region having a pre-determined level of inter-block data consistency, to determine a predictor for each region, and to encode each region using its predictor by scaling to a predetermined scaled size.

In another embodiment, a method of decoding a compressed bitstream representing a video signal having a plurality of frames is provided where at least one frame has a plurality of regions. The method includes identifying a scaled residual of a region in a frame in the plurality of frames, the region including a plurality of contiguous blocks, identifying at least one region parameter and at least one region token associated with the scaled residual, and identifying a predictor using the at least one region token. Finally, the method includes decoding a region using the scaled region, predictor and at least one region parameter using a processor.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
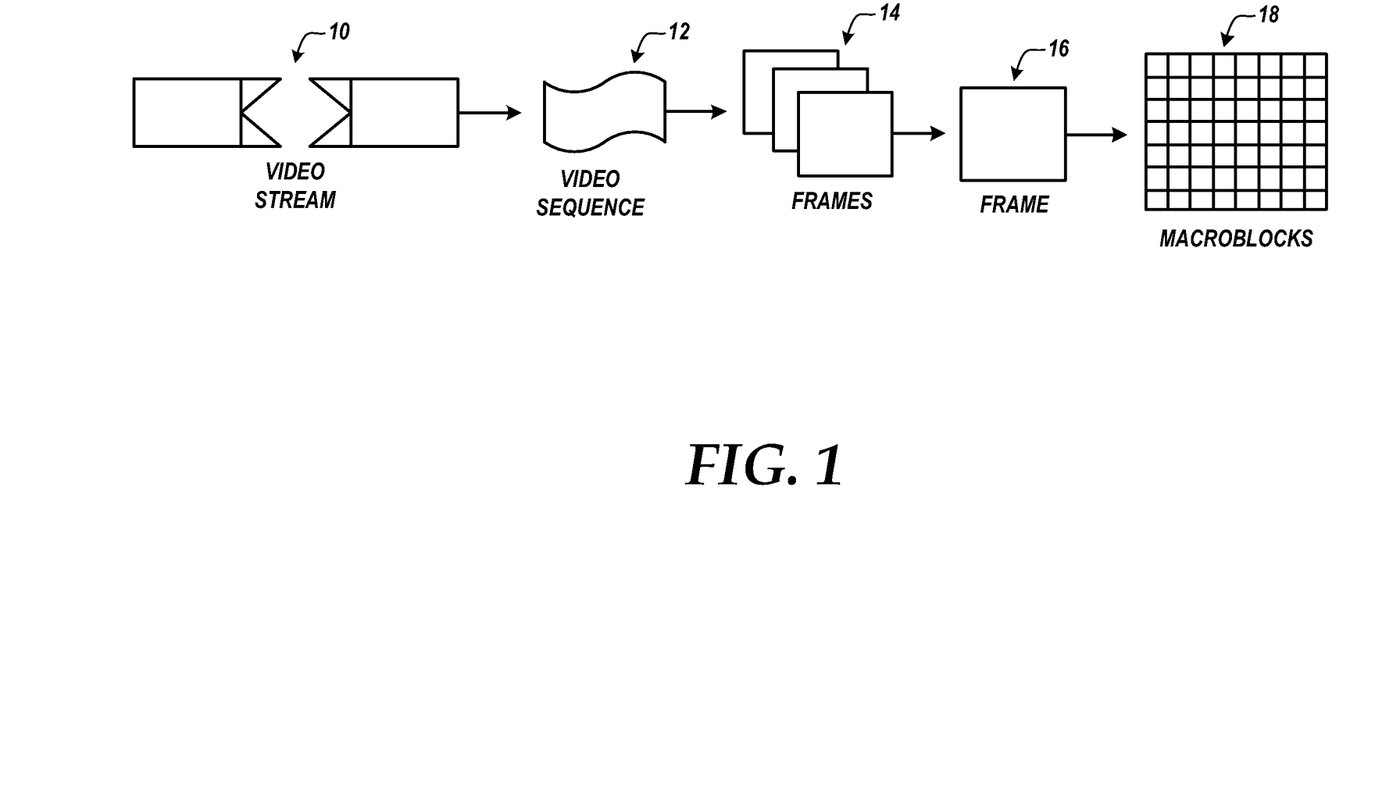
FIG. 1 is a diagram of a video bitstream.

FIG. 1 is a diagram an input video stream 10 to be encoded and subsequently decoded. Video coding formats, such as VP8 or H.264, provide a defined hierarchy of layers for video stream 10. Video stream 10 includes a video sequence 12. At the next level, video sequence 12 consists of a number of adjacent frames 14, which can then be further subdivided into a frame 16. At the next level, frame 16 can be divided into a series of blocks or macroblocks 18, which can contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups. Unless otherwise noted, the terms macroblock and block are used interchangeably herein.

Figure 2:
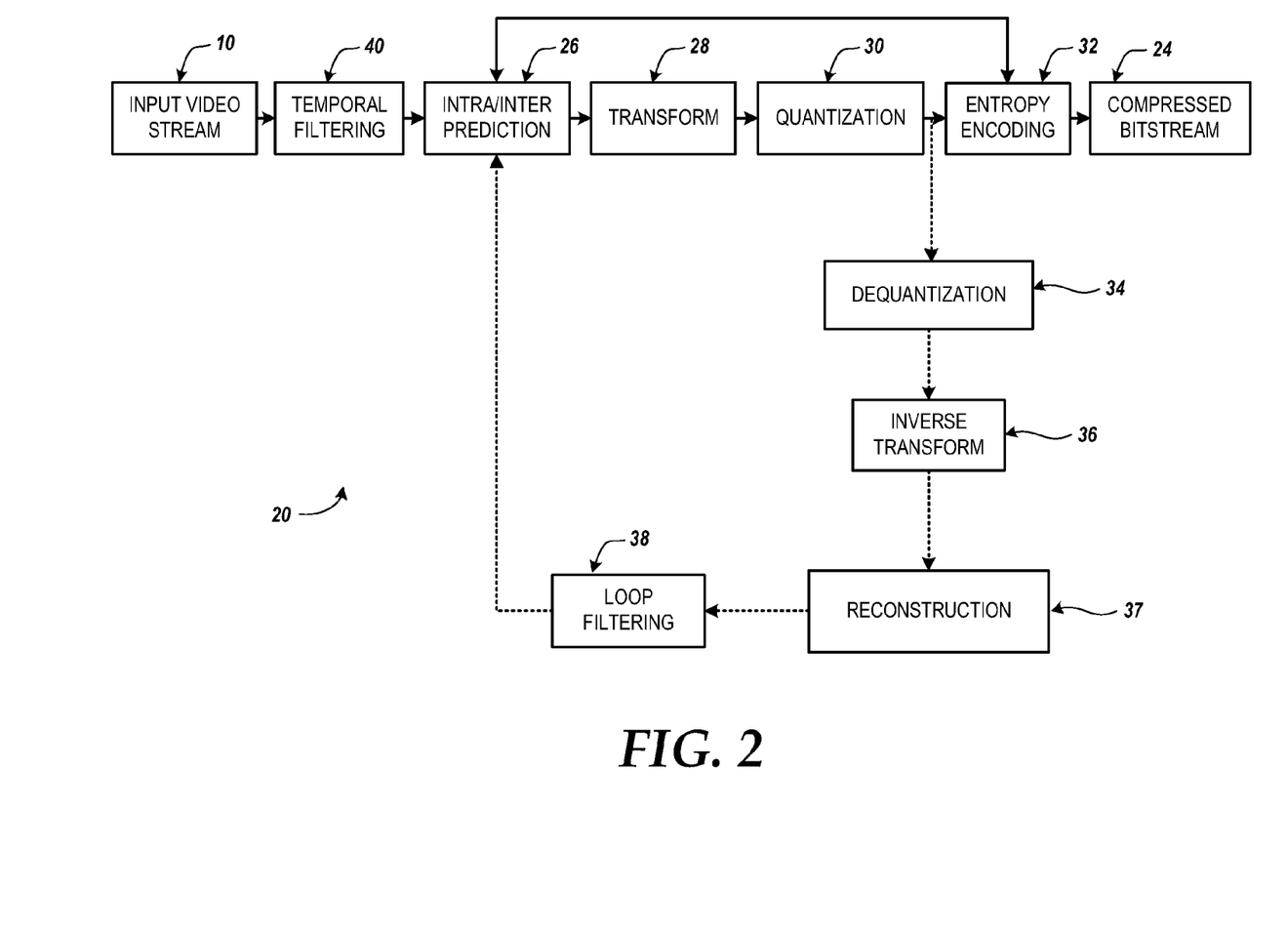
FIG. 2 is a block diagram of a video compression system in accordance with one embodiment.

FIG. 2 is a block diagram of a video compression system in accordance with one embodiment. An encoder 20 encodes an input video stream 10. Encoder 20 has the following stages to perform the various functions in a forward path (shown by the solid connection lines) to produce an encoded or a compressed bitstream 24: a temporal filter stage 40, an intra/inter prediction stage 26, a transform stage 28, a quantization stage 30 and an entropy encoding stage 32. Encoder 20 also includes a reconstruction path (shown by the dotted connection lines) to reconstruct a frame for encoding of further macroblocks. Encoder 20 has the following stages to perform the various functions in the reconstruction path: a dequantization stage 34, an inverse transform stage 36, a reconstruction stage 37 and a loop filtering stage 38. Other structural variations of encoder 20 can be used to encode input video stream 10.

Encoder 20 includes a temporal filter 40, which as shown in FIG. 2 can be included with the intra/inter prediction stage 26. Temporal filter 40 can be used to synthesize a reference or alternative predictor frame. The parameters of the temporal filter 40 can be adjusted to create a reduced-noise frame for use as a predictor during the encoding process. This adjustment process can permit the filtering to take into account contextual information (such as, for example, encoding modes) and other input to establish the degree of correlation between adjacent frames to filter noise from a common underlying signal. The process can be applied at the full-frame, macro-block or any other segmentation of the frame where the degree of spatial correlation between frames can be established.

When input video stream 10 is presented for encoding, each frame 16 within input video stream 10 is processed in units of macroblocks. At intra/inter prediction stage 26, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at intra/inter prediction stage 26 to produce a residual macroblock (residual). Transform stage 28 transforms the residual into transform coefficients in, for example, the frequency domain, and quantization stage 30 converts the transform coefficients into discrete quantum values, which are referred to as quantized transform coefficients or quantization levels. The quantized transform coefficients are then entropy encoded by entropy encoding stage 32. The entropy-encoded coefficients, together with the information required to decode the macroblock, such as the type of prediction used, motion vectors, and quantizer value, are then output to compressed bitstream 24.

The reconstruction path in FIG. 2 is present to ensure that both encoder 20 and a decoder 42 (described below) use the same reference frames to decode compressed bitstream 24. The reconstruction path performs functions that are similar to functions that take place during the decoding process that are discussed in more detail below, including dequantizing the quantized transform coefficients at dequantization stage 34 and inverse transforming the dequantized transform coefficients at an inverse transform stage 36 in order to produce a derivative residual macroblock (derivative residual). At reconstruction stage 37, the prediction macroblock that was predicted at intra/inter prediction stage 26 can be added to the derivative residual to create a reconstructed macroblock. A loop filter 38 can then be applied to the reconstructed macroblock to reduce distortion such as blocking artifacts.

Other variations of encoder 20 can be used to encode compressed bitstream 24. For example, a non-transform based encoder can quantize the residual signal directly without transform stage 28. Or, the temporal filter 40 might not be present. In another embodiment, an encoder may have quantization stage 30 and dequantization stage 34 combined into a single stage.

The encoding process shown in FIG. 2 can include two iterations or "passes" of processing the video data. The first pass can be carried out by encoder 20 using an encoding process that is less computationally intensive, and that gathers and stores information about input video stream 10 for use in the second pass. In the second pass, encoder 20 uses this information to optimize final encoding of compressed bitstream 24. For example, encoder 20 may use this information to select parameters for encoding, locating key-frames and selecting coding modes used to encode macroblocks 18, and allocating the number of bits to each frame. The output of the second pass can be compressed bitstream 24.

Figure 3:
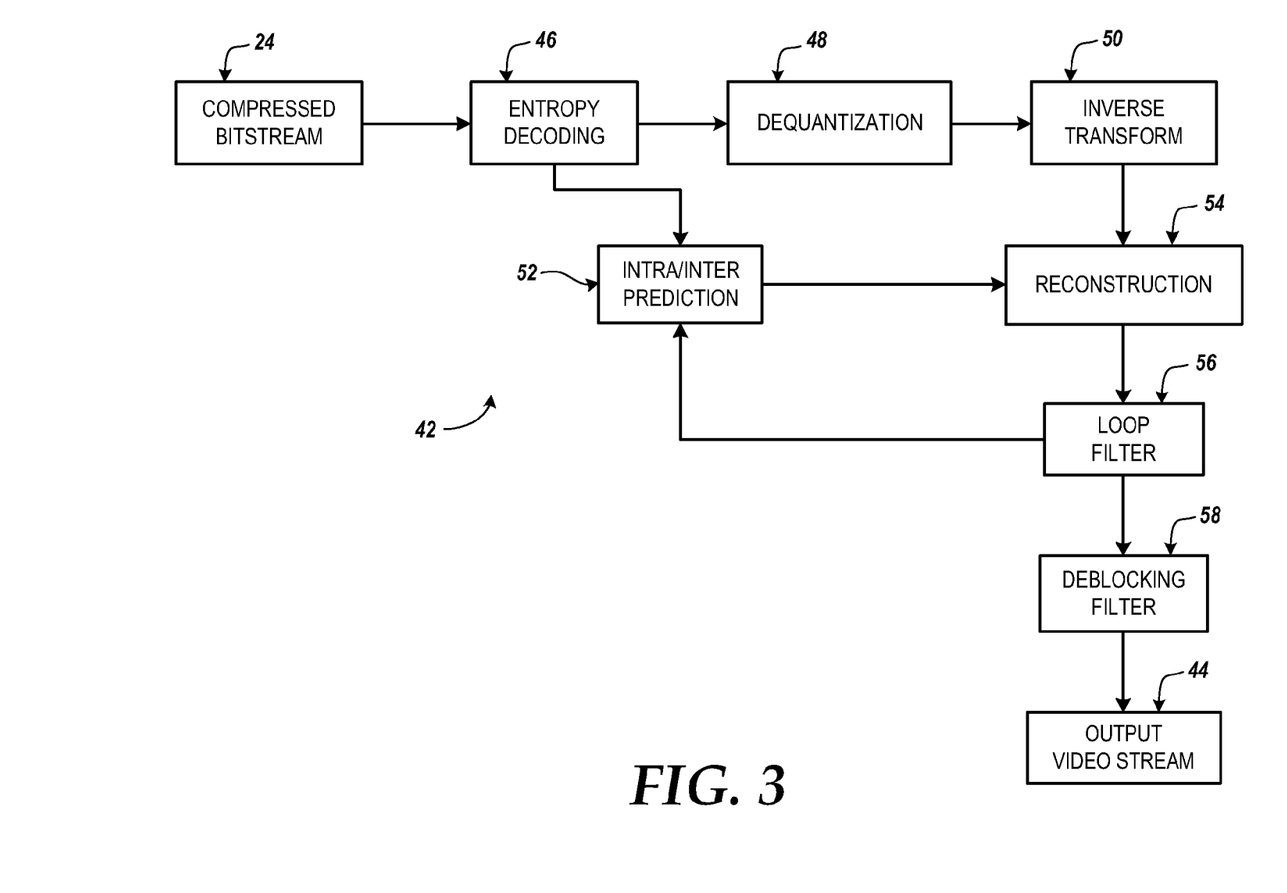
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, includes the following stages to perform various functions to produce an output video stream 44 from compressed bitstream 24: an entropy decoding stage 46, a dequantization stage 48, an inverse transform stage 50, an intra/inter prediction stage 52, a reconstruction stage 54, a loop filter stage 56 and a deblocking filtering stage 58. Other structural variations of decoder 42 can be used to decode compressed bitstream 24.

When compressed bitstream 24 is presented for decoding, the data elements within compressed bitstream 24 can be decoded by entropy decoding stage 46 (using, for example, Context Adaptive Binary Arithmetic Decoding) to produce a set of quantized transform coefficients. Dequantization stage 48 dequantizes the quantized transform coefficients, and inverse transform stage 50 inverse transforms the dequantized transform coefficients to produce a derivative residual that can be identical to that created by the inverse transform stage 36 in the encoder 20. Using header information decoded from the compressed bitstream 24, decoder 42 can use intra/inter prediction stage 52 to create the same prediction macroblock as was created in encoder 20. At the reconstruction stage 54, the prediction macroblock can be added to the derivative residual to create a reconstructed macroblock. The loop filter 56 can be applied to the reconstructed macroblock to reduce blocking artifacts. Deblocking filter 58 can be applied to the reconstructed macroblock to reduce blocking distortion, and the result is output as output video stream 44.

Other variations of decoder 42 can be used to decode compressed bitstream 24. For example, a decoder may produce output video stream 44 without deblocking filtering stage 58.

Referring again generally to encoder 20, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames.

As described briefly above, many video coding algorithms first partition each picture into macroblocks. Then, each macroblock can be coded using some form of predictive coding method. Some video coding standards use different types of predicted macroblocks in their coding. In one scenario, a macroblock may be one of three types: 1) Intra (I) macroblock that uses no information from other pictures in its coding; 2) Unidirectionally Predicted (P) macroblock that uses information from one preceding picture; and 3) Bidirectionally Predicted (B) macroblock that uses information from one preceding picture and one future picture.

Referring again to quantization stage 30, the process of quantization represents the range of transform coefficient values with a finite set of states, which as discussed previously, can be referred to as quantized transform coefficients or quantization levels. Some compression systems use a scalar quantization process, which can perform dividing operations on the transform coefficient values. The divisor used to perform the dividing operations affects the number of bits used to represent the image data as well as the quality of the resulting decoded image. Generally, when the divisor is set to a high value, the quantization process produces higher compression but also deteriorates the quality of the image. Conversely, setting the divisor to a low value results in improved image quality but less compression. During decoding, a corresponding dequantization process in, for example, dequantization stage 48, can perform multiplication operations using the same divisor value to convert the quantized transform coefficients to dequantized transform coefficients.

It is possible that it may be advantageous to process blocks that are a certain block size, for example 16×16, at a different block size for encoding purposes. For example, it may be advantageous to transform a larger block to a 4×4 block size. In such cases, blocks may be resized from one block size to another for processing purposes. Such resizing can be performed in various ways, including using bilinear and bicubic scaling techniques. Bilinear scaling occurs wherein the value of one pixel is calculated from the nearest 2×2 using a weighted average, while bicubic scaling uses 4×4 pixels to calculate the value of one pixel where closer pixels are given higher weighting. These resized blocks may then be used in the quantization stage 30.

By dividing a frame into regions of differing sizes as described herein, and then processing them into a respective single block's worth or pixel data using typical scaling techniques, different parts of the image are encoded at different resolutions.

Figure 4A:
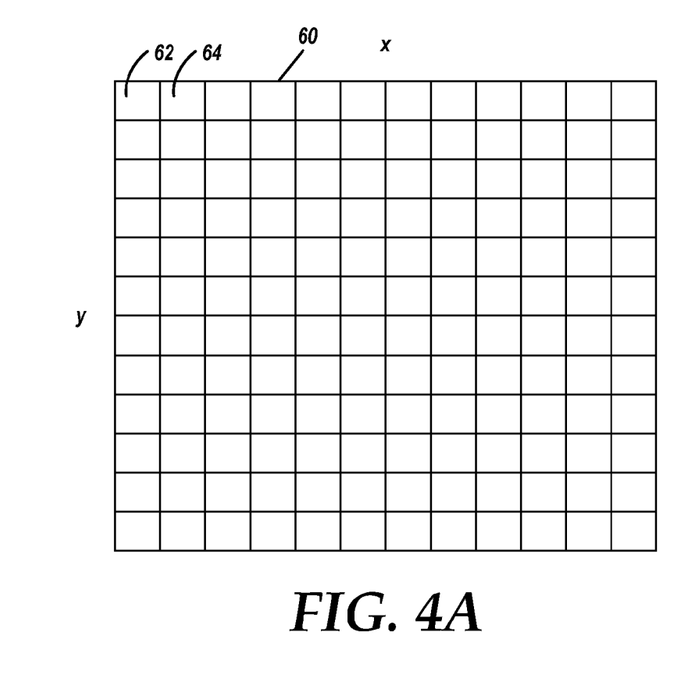
FIG. 4A is a schematic diagram of a frame divided into blocks.

Regions as used herein are next described. FIG. 4A is a schematic diagram of a frame 60 divided into blocks such as block 62. The location of each block in frame 60 is defined by its x and y coordinates in the frame. For purposes of block location, the values of x and y are defined at a block level granularity. For example, block 62 has a location of (0, 0) and block 64 has a location of (1, 0). Alternatively, the coordinates may be defined by a different coordinate system. For example, the first block 62 may have a location of (1, 1).

Figure 4B:
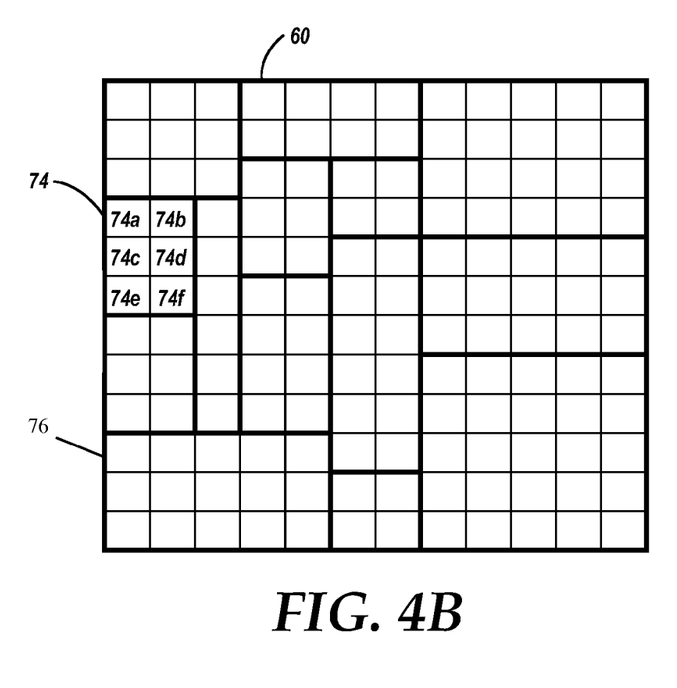
FIG. 4B is a schematic diagram of the frame of FIG. 4A divided into regions.

FIG. 4B is a schematic diagram of the frame 60 of FIG. 4A divided into regions. The regions are shown in by the bolded boundaries. For example, a first region 74 and a second region 76 are shown. The first region 74 is two blocks wide and three blocks high, whereas the second region 76 is five blocks wide and three blocks high. The blocks in the first region 74 are labeled as blocks 74a-74f.

Regions are defined by a starting block location, a region width and a region height, which collectively form parameters of a region. As such, regions are a group of contiguous blocks. The starting block is the block at the top left corner of the region. For example, with respect to the first region 74, the starting block is block 74a. The width of the first region 74 is two (as shown by blocks 74a and 74b) and the height of the first region is three (as shown by blocks 74a, 74c, and 74e). An exemplary region parameter for region 74 can be defined as (0, 3, 2, 3) using a format of (x, y, w, h), wherein w is width and h is height.

Each region also has a region area. The region area of a region is calculated by multiplying the region width by the region height. For example, the region area of first region 74 is two multiplied by three, or six.

Figure 5:
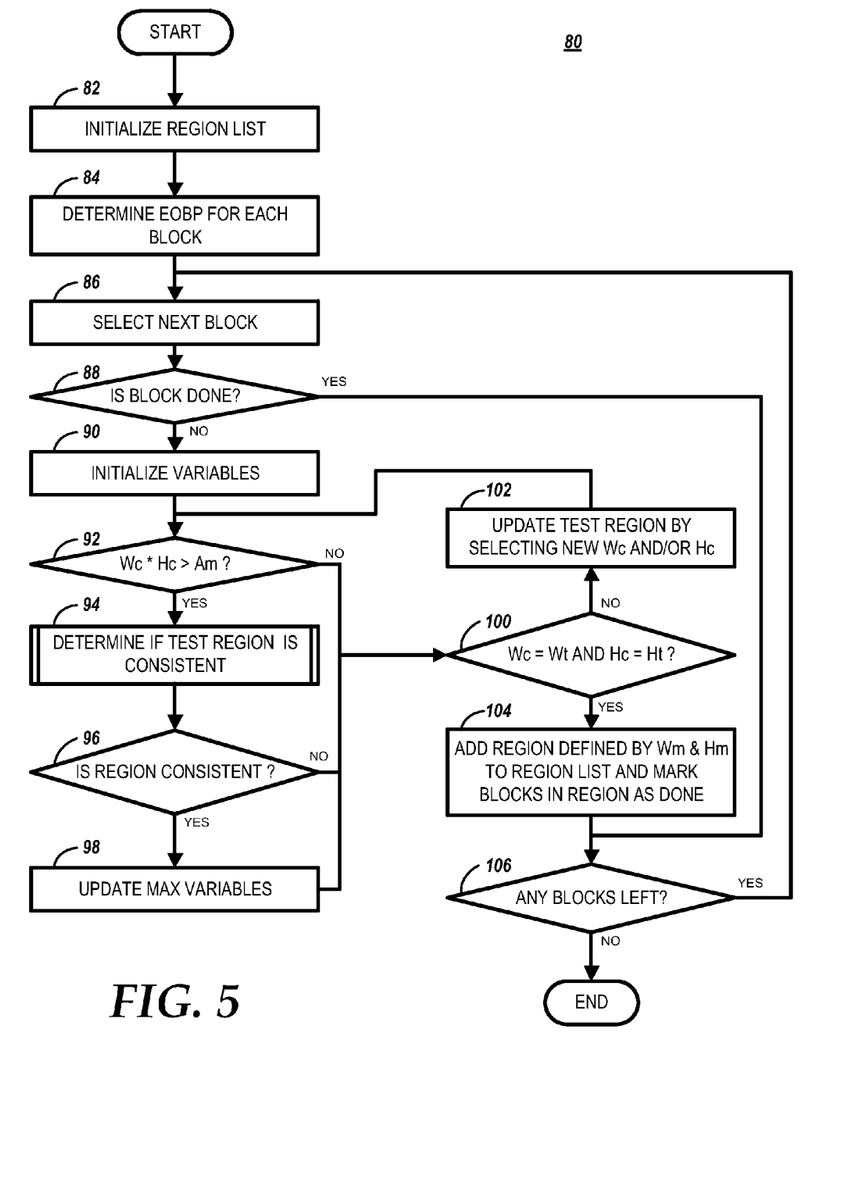
FIG. 5 is a flow chart of a method of determining a list of regions such as the regions depicted in FIG. 4B.

A description of methods to determine and encode regions in a frame is now provided. FIG. 5 is a flow chart of a method (80) of determining a list of regions such as the regions depicted in FIG. 4B. First, a region list is initialized (82). The initialization creates an empty region list. The region list eventually contains region parameters for each region determined within the frame 60.

An end of block position (EOBP) is determined for each block in the frame (84). The EOBP of a block is determined from performing a quantized transform on a block to produce a block of transform coefficients (similar to the process in transform stage 28). The transform can be a discrete cosine transform (DCT). One type of DCT that can be used is a 4×4 pixel DCT. A transform such as the DCT is advantageous because the transform coefficients are in the frequency domain and the significant values are concentrated at the top left of the block. Alternatively, the transform may be performed using an alternate methodology, such as a wavelet transform.

With respect to the 4×4 pixel DCT, such a methodology may be used regardless of whether the block size is 4×4 or not. For example, the 4×4 pixel DCT methodology may be used if the block size were 16×16 or 16×8. In such an instance, the block would be resized to the smaller 4×4 block size using the techniques described previously.

Once the block of transform coefficients is produced, the transform coefficients are quantized into quantized transform coefficients (similar to quantization stage 30). One method of quantization is to select a divisor and to divide the transform coefficients by that divisor to obtain the quantized transform coefficients. As such, the quantization process will eliminate the less significant coefficients by reducing them to zero.

In a consistent (low complexity) block, the quantization process will result in many quantized transform coefficients that are zero. Conversely, an inconsistent (high complexity) block will result in fewer quantized transform coefficients that are zero.

One way of representing a block of quantized transform coefficients is in a list compiled in a diagonal zig-zag order starting at the top left value of the block of quantized transform coefficients. The end of block in the list is marked when all of the remaining values in the block of quantized transform coefficients is zero. The EOBP is calculated based on the location of the end of block in the list. For example, if there is only one non-zero value in the block of quantized transform coefficients, the EOBP for the block would be one.

Once the EOBP is determined for each block, the frame will be processed to find the regions in the frame. First, the next available block in the frame is selected (86). The first block selected in the method can be the top left block of the frame, for example block 62 in frame 60. Each next block after the first block may be selected, for example, in raster order.

Selecting in raster order means selecting from left to right in a line of blocks, and once the last block in the line is selected, selecting the first block in the next line of blocks. Alternately, other methods of selecting may be used. For example, blocks may be selected first from top to bottom in a column of blocks or the next selected block can change based upon the width or height of the last region added to the region list.

Next, the selected block is checked to see if it is done (88). A block is done if it is a part of a region that has been added to the region list. If the selected block is done, it is checked whether or not there are blocks left in the frame (106). If there are blocks left in the frame, control returns to select the next block (86). Otherwise, the method (80) ends.

However, if the selected block is not done (88), consistent regions having a starting block as the selected block are found. Namely, variables are initialized for the starting block (90). An exemplary initialization of variables is shown in equations (1) and (2):

$$Am = Wm = Hm = 0 \qquad (1)$$

wherein
Am is the maximum region area of the consistent regions defined by the starting block;
Wm is the width of the consistent region having the maximum region area; and
Hm is the height of the consistent region having the maximum region area. In addition, $$Wc = Hc = 1 \qquad (2)$$

wherein
Wc is the current test region width; and
Hc is the current test region height.

The region area of the current test region (Wc*Hc) is compared to the maximum region area Am (92). If the region area of the current test region is greater than the maximum region area Am, a determination is made as to whether the test region is consistent (94), that is, there is a predetermined level of inter-block data consistency to the blocks of the test region. An exemplary method of determining whether the test region is consistent is described with respect to FIG. 6 and is discussed hereinafter.

If the test region is consistent (96), the max variables (i.e., Am, Wm and Hm) are updated (98) as shown in equations (3), (4), and (5):

$$Am = Hc * Wc \qquad (3)$$

$$Hm = Hc \qquad (4)$$

and $$Wm = Wc \qquad (5)$$

The max variables represent a consistent potential region. This consistent potential region may be replaced by a larger consistent potential region or may be added to the region list as a member region of the list as demonstrated in the following steps.

If the region area of the current test region is not greater than the maximum region area (92), if the test region is not consistent (96), or after the max variables have been updated (98), the test region as defined by Wc and Hc is compared to a threshold test region as defined by a maximum test region width Wt and a maximum test region height Ht (100).

If Wc does not equal Wt or Hc does not equal Ht (100), Wc and/or Hc are updated to create a new test region (102). An exemplary way of updating Wc and Hc is as follows. If Wc is equal to Wt, Wc will be set to 1 and Hc will be incremented by 1. However, if Wc is not equal to Wt, then Wc will be incremented by 1. However, any method of updating Wc and Hc is permissible, so long that all combinations of Wc and Hc up to Wt and Ht (that is, all potential regions as represented by all potential region widths and all potential region heights) are used before Wc is set to Wt and Hc is set to Ht. Once Wc and/or Hc are updated, control returns to compare the area of the new test region against the maximum area Am (92).

In contrast, if Wc equals Wt and Hc equals Ht, the region defined by the max variables (i.e., Am, Wm and Hm) is added to the region list as a member region, and the blocks included in that region are marked as done (104). If any blocks are left (106), the next block is selected (86). Otherwise, the method (80) ends.

Figure 6:
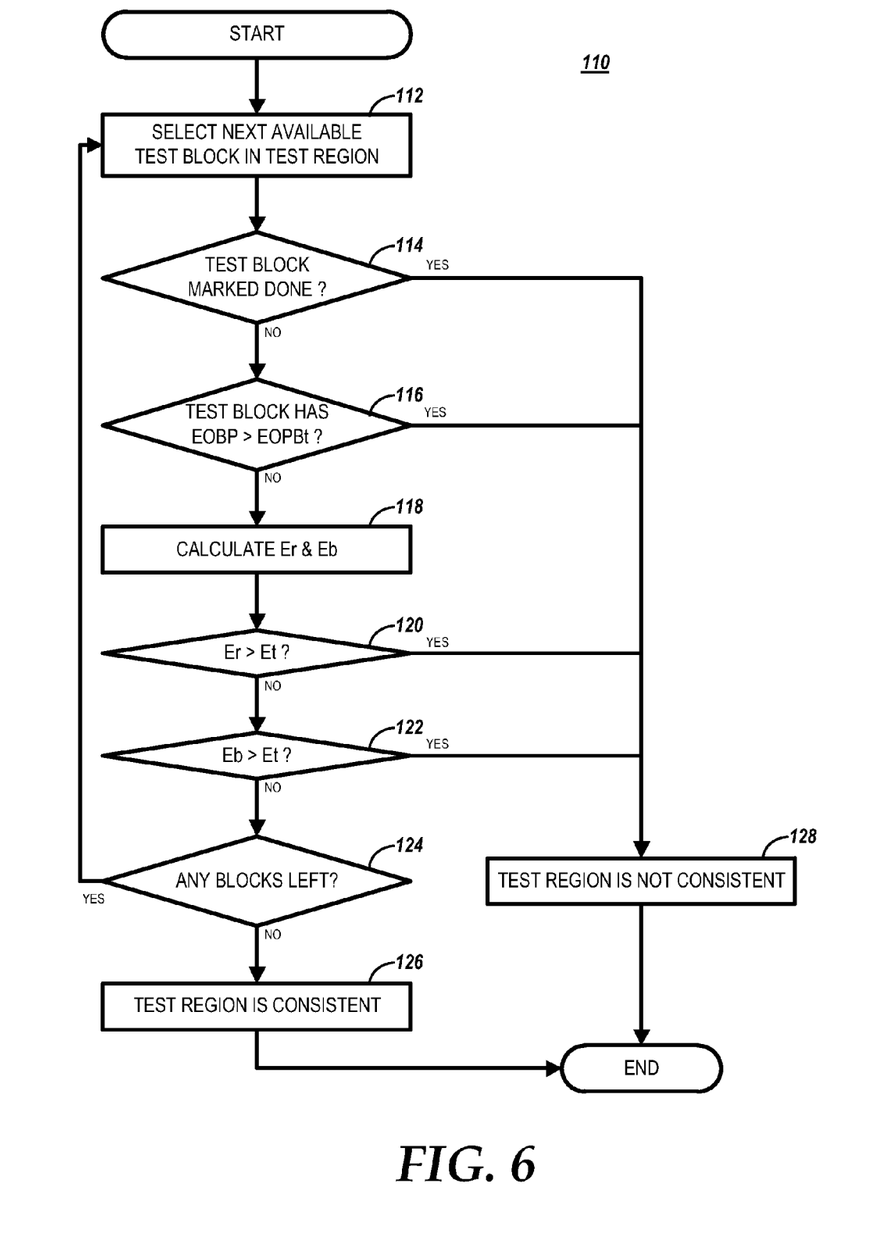
FIG. 6 is a flow chart of a method of determining whether a test region is consistent as used in the method of FIG. 5.

FIG. 6 is a flow chart of a method (110) of determining whether a test region is consistent (86) in the method (80) of FIG. 5. A consistent test region has a pre-determined level of inter-block data consistency. The method (110) is performed on a test region defined by region parameters including coordinates of a starting block and a width Wc and height Hc.

The next available block in the test region is first selected (called a test block herein) (112). If this is the first block to be selected, the starting block will be selected. Subsequent test blocks can be selected in raster order although blocks can be selected in any order as long as all blocks can eventually be selected.

For each test block, a series of tests will be performed to determine whether the test block has a pre-determined level of inter-block data consistency. Each test will determine whether or not the test block has consistent data. If any test determines that the test block does not have consistent data, the test block (and test region) will be considered to not have consistent data. In other words, these tests assure a predetermined level of inter-block data consistency to each region.

One test determines whether the test block is marked as done (114). In other words, is the block already included in the region list? If the block is marked as done, the test block (and test region) is not consistent (128), and the method (110) ends.

If the block is not marked as done (114), the next test is performed. The next test is whether or not the EOBP of the test block is greater than an end of block position threshold EOBPt (116). The EOBP of the test block was previously described (84) with respect to FIG. 5. The threshold EOBPt can be predetermined or determined based upon conditions in the encoding process. An exemplary EOBPt value is three. If EOBP is greater than EOBPt, the test block (and test region) is not consistent (128), and the method (110) ends.

Next, the right edge error Er and bottom edge error Eb are calculated (118). Right edge error Er will only be calculated if the test block is not in the last column of blocks of the test region (e.g., right edge error Er would not be calculated for block 74*b* of region 74 in FIG. 4B). Correspondingly, bottom edge error Eb will only be calculated if the test block is not in the last row of blocks of the test region (e.g., bottom edge error Eb would not be calculated for block 74*e* of region 74 in FIG. 4B).

An edge error Er, Eb represents the difference between the pixels in the test block adjoining the edge and the pixels in an adjacent block adjoining the edge. An exemplary technique of calculating the edge error is now described. The test block and the adjoining block are identified based upon the edge for which the edge error is to be calculated. In each block, each pixel that is adjacent to the edge is identified. An absolute difference is taken between each pair of immediately adjacent pixels. For example, a pair of immediately adjacent pixels may be the top right pixel in the test block and the top left pixel in the adjacent block with respect to a right edge error. The differences for each pair of immediately adjacent pixels may be summed or averaged together to calculate the edge error Er, Eb.

Alternatively, the edge error Er, Eb can be calculated by a variety of other methods. Other methods may include the sum of absolute transformed differences (SATD) or the sum of squared differences (SSD). These methods may measure the pixels immediately adjacent to the edge, or may include additional pixels within the test block and/or the adjacent block.

A right edge error threshold Et and a bottom edge error threshold Et are also defined. The edge error thresholds in this embodiment are the same for right and bottom, but they can be different. The edge error threshold Et determines what level of difference between two blocks will result in the region being not consistent.

Once the edge errors Er, Eb are calculated and the edge thresholds Et identified, right edge error Er is compared to edge threshold Et (120). If right edge error Er is greater than edge threshold Et, then the test region is not consistent (128). Otherwise, bottom edge error Eb is compared to edge threshold Et (122). If bottom edge error Eb is greater than edge threshold Et, then the test region is not consistent (128).

Once all the tests are completed, it is determined whether any blocks are left to be selected (124). If so, control returns to select the next available test block (112). If no blocks are left (124), the test region is consistent (126), since no test in the test region found an inconsistency. In other words, the test region has a pre-determined level of inter-block data consistency. The method (110) then ends and returns the result as to whether the test region is consistent for use with respect to FIG. 5 (96).

Again, with respect to the tests of FIG. 6, the tests may be performed in a different order, some or all of the tests may be removed, or tests may be added. For example, the EOBP test (116) may be removed from the tests performed. As another example, an alternate test may be added to evaluate whether the test region is consistent as a whole. The alternate test could, for example, scale the test region to a smaller scaled test region, such as 4×4 pixels. The alternate test would then calculate an alternate error score comparing the scaled test region to the test region. The test region would be considered to be consistent if the alternate error score was less than an alternate error score threshold. These tests are examples only, and alternative tests may be used.

Figure 7:
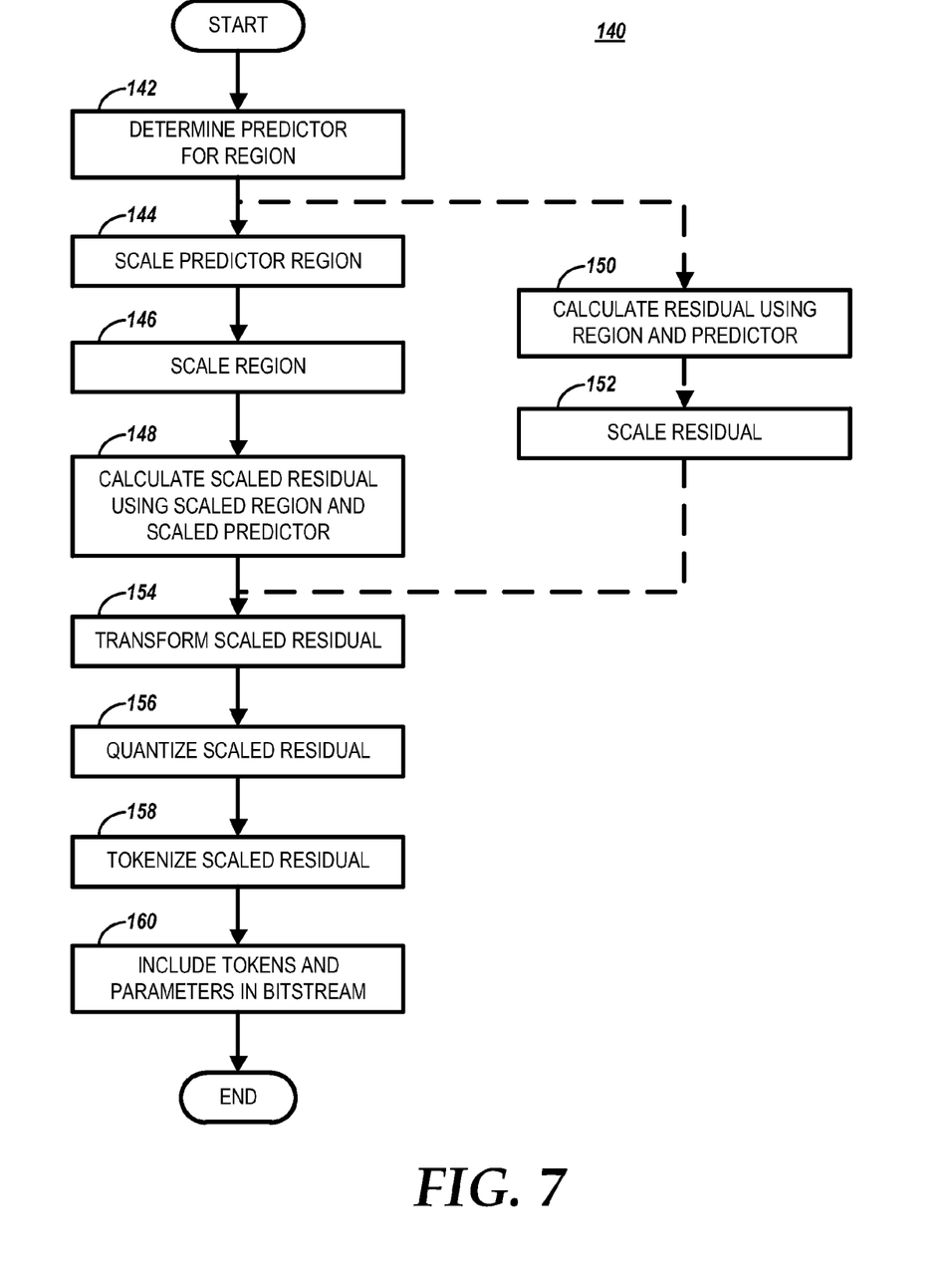
FIG. 7 is a flow chart of a method of encoding the frame as represented by the list of regions determined in FIG. 5 in the video compression system of FIG. 2.

FIG. 7 is a flow chart of a method (140) of encoding the frame as represented by the list of regions determined in FIG. 5 in the video compression system of FIG. 2. The method (140) as described is performed on a single region in the region list to encode that single region. However, the method can be used sequentially to encode all of the regions in the region list (i.e. all regions in the frame).

First, a predictor (comprising a region the same size as the region) is determined for the region (142). The predictor can be determined using a standard motion vector search on the blocks comprising the region in the frame, an alternative reference frame, a golden frame or another reference frame.

In one embodiment, the determined predictor is scaled (144) and the region is scaled (146). The scaling can be to any predetermined scaled size. Once the scaled predictor and the scaled region are determined, a scaled residual is calculated based on the difference between the scaled predictor and the scaled region (148).

Scaling may be performed using any scaling method, for example using bilinear or bicubic scaling methods as described previously. An example predetermined scaled size is a 4×4 block of pixels. Alternate scaled sizes may also be used. Alternatively, the scaled region may include more than one block, for example, four 4×4 blocks of pixels.

In an alternative embodiment, as shown by the dashed lines, the residual is first calculated by the differences between the region and the predictor (150). Then the residual is then scaled to the predetermined scaled size (152). The steps performed in these embodiments can be performed in the intra/inter prediction stage 26 of the encoder 20. Also, these are only exemplary ways of scaling a region into a residual to be encoded. Other alternatives are also available.

Once the scaled residual is calculated, the scaled residual is transformed (154). The transform may be performed using a DCT or any other type of transform, as discussed in more detail previously. The transform can be performed at the same resolution (i.e. 4×4) as the predetermined scaled size. However, transform can be performed at a different size than the predetermined scaled size. This step can be performed in transform stage 28 or otherwise of encoder 20.

After the scaled residual is transformed, the transformed scaled residual is quantized (156). As discussed before, quantization eliminates the low frequency data from the transformed scaled residual to reduce the size of the transformed scaled residual. This step can be performed in quantization stage 30 of the encoder 20.

After the transformed scaled residual is quantized, the scaled residual is tokenized to create at least one region token (158). A region token is a representation of the parameters used to encode the region. For example, a region token may indicate the size and location of the determined predictor. As another example, a region token may indicate the quantization level and/or quantization technique used. These are only examples, and any encoding parameter may be included in a region token.

Once at least one region token is created (158), the region token(s) and region parameter(s) are included in the compressed bitstream 24 along with the quantized scaled residual (160). Both can be used by the decoder 42 when decoding the regions encoded into the compressed bitstream.

The encoding process as described is only an illustrative method of encoding regions. Steps may be added, removed or changed as necessary. For example, the predictor may not be determined directly from the region or may not be the same size as the region. Or the region may be scaled prior to determining the predictor for the region. In addition, the various steps of the method can be performed in other stages of the encoder 20 than those identified depending on the implementation of encoder 20.

Figure 8:
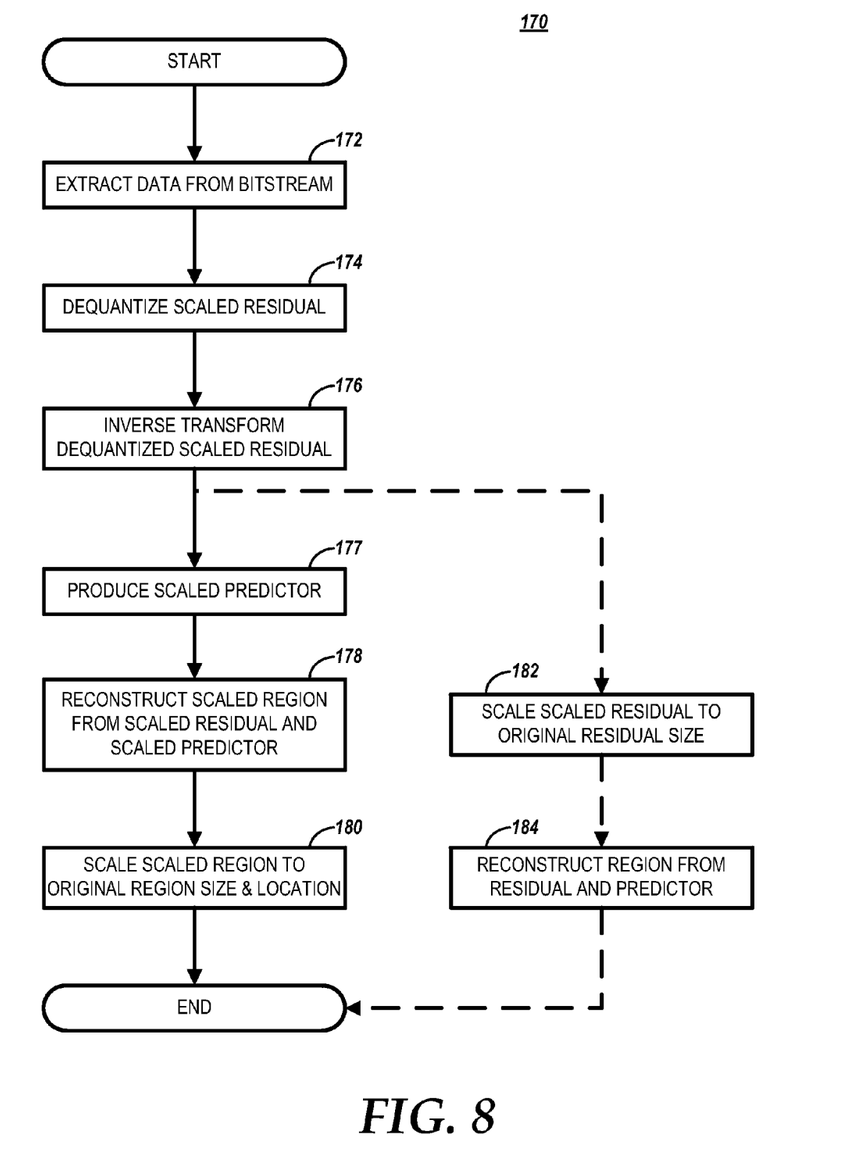
FIG. 8 is a flow chart of a method of decoding (such as in the decoder of the video decompression system of FIG. 3) the frame as encoded by the video compression system as shown in FIG. 7.

FIG. 8 is a flow chart of a method (170) of decoding (such as in the decoder 42 of the video decompression system of FIG. 3) the frame as encoded by the video compression system as shown in FIG. 7. Method (170) is shown for a single region but can be repeated to decode an entire frame's worth of regions.

First, data including a transformed, quantized scaled residual, region parameter(s) and region token(s) are extracted from the compressed bitstream 24 (172). The scaled residual is dequantized (174) and inverse transformed (176) to recreate a scaled residual (for example, in dequantization stage 48 and inverse transform stage 50 of the decoder 42). The dequantization and inverse transform are the inverse of what was performed during encoding (154, 156). The parameters and methods of doing so may be pre-negotiated between the encoder 20 and decoder 42 or alternately may be communicated using region tokens on a per region basis.

Then, in one embodiment, the scaled predictor is produced (177), and the scaled region is reconstructed using the scaled residual and the scaled predictor (178). This may be performed, for example, in reconstruction stage 54 of the decoder 42. The scaled predictor is produced using identifying information in a region token and using a reference frame already existing in the decoder. Once the scaled region is reconstructed, it is scaled back to its original size and location (180). The original size and location of the region is identified using the at least one region parameter.

In an alternative embodiment, as shown by the dashed lines, the scaled residual is first scaled back to the original region size (182). Then the region is reconstructed in its original size using the residual and a predictor (184). As before, the predictor can be determined using a region token, and the original size and location of the region can be determined using a region parameter.

The decoding process as described is only an illustrative method of decoding regions. Steps may be added, removed or changed in order as necessary. For example, dequantization (174) may be performed before the inverse transform (176). In addition, the various steps of the method can be performed in other stages of the decoder 42 than those identified depending on the implementation of decoder 42.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

Figure 9:
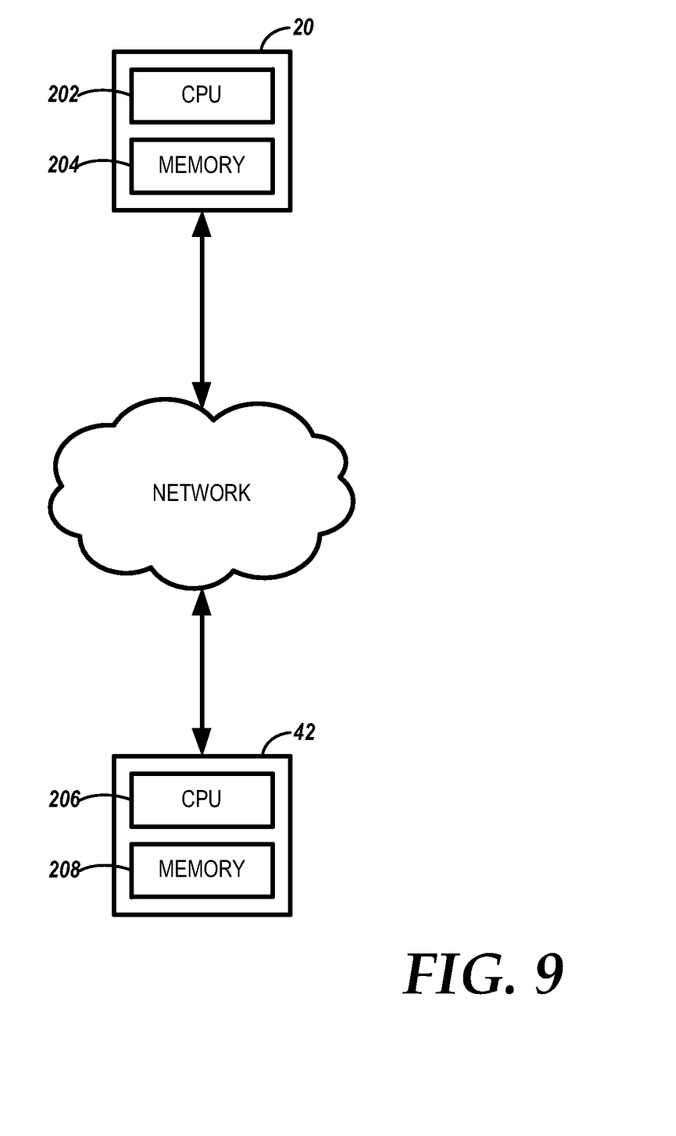
FIG. 9 is a block diagram of computer systems implementing the video compression system and video decompression system described herein.

For example, encoder 20 can be implemented using a general purpose processor with a computer program that, when executed, carries out any of the respective methods, algorithms and/or instructions described herein. FIG. 9 illustrates one suitable implementation in which encoder 20 is implemented in a general purpose computer including a central processing unit (CPU) 202 and random access memory (RAM) 204. Decoder 42 is implemented using a general purpose computer including a central processing unit (CPU) 206 and random access memory (RAM) 208. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

Encoder 20 and decoder 42 can, for example, be implemented in a wide variety of configurations, including for example on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device, using the Internet for example, as shown in FIG. 9. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The operations of encoder 20 or decoder 42 (and the algorithms, methods, instructions etc. stored thereon and/or executed thereby) can be realized in hardware, software or any combination thereof. All or a portion of embodiments of the present invention can take the form of a computer program product accessible from, for example, a computer-usable or computer-readable medium. A computer-usable or computer-readable medium can be any device that can, for example, tangibly contain, store, communicate, and/or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a plurality of frames, each frame having a plurality of blocks, the method comprising:
   subdividing a frame of the plurality of frames into a plurality of regions using a processor, each region including at least one block of the plurality of blocks, and a first region of the plurality of regions composed of a contiguous group of the plurality of blocks having a defined level of data consistency, wherein the first region has a first size larger than a size of at least one other region of the plurality of regions and each block of the plurality of blocks has a same block size;
   determining a respective predictor for each region of the plurality of regions;
   generating a residual for each region using the respective predictor for each region; and encoding each region by encoding the residual for each region, each residual having a same, second size smaller than the first size of the first region.

2. The method of claim 1 wherein encoding each region comprises:
scaling the residual for each region that is larger than the second size from a respective original size to the second size to form a scaled residual;
transforming each scaled residual into a transformed scaled residual;
quantizing each transformed scaled residual into a quantized scaled residual;
creating at least one region token for each quantized scaled residual; and
encoding each region using its quantized scaled residual, at least one region parameter, and at least one region token.

3. The method of claim 1 wherein generating the residual comprises:
determining a scaled region by scaling each region larger than the second size from a respective original size to the second size;
scaling the predictor for each region larger than the second size from the respective original size to the second size to form a scaled predictor; and
determining a difference between the scaled region and the scaled predictor as a scaled residual; wherein encoding the residual comprises encoding the scaled residual.

4. The method of claim 1 wherein each region has a region parameter, the region parameter including a region starting block location and an original region size comprising a region width and a region height; and wherein the original region size of the first region is the first size.

5. The method of claim 1 wherein subdividing the frame of the plurality of frames into the plurality of regions comprises:
identifying a plurality of potential regions;
determining at least one potential region from the plurality of potential regions that exhibits the defined level of data consistency as at least one consistent potential region;
selecting a region from the at least one consistent potential region to include in the plurality of regions.

6. The method of claim 5 wherein identifying the plurality of potential regions comprises:
identifying a starting block having a block location in the frame;
determining a plurality of potential region widths and a plurality of potential region heights; and
identifying the plurality of potential regions using the starting block, the plurality of potential region widths and the plurality of potential region heights.

7. The method of claim 6 wherein each consistent potential region has a region area and selecting the region from the at least one consistent potential region comprises:
determining a maximum region area from the region areas associated with the at least one consistent potential region; and
selecting the region as the at least one consistent potential region having the maximum region area.

8. The method of claim 6 wherein identifying a starting block comprises:
identifying the starting block in raster order from a previously identified starting block.

9. The method of claim 5 wherein the identifying the plurality of potential regions, determining at least one potential region from the plurality of regions has consistent data, and selecting the member region from the at least one potential region to include in the plurality of regions are each performed at least until every block in the frame is included in one of the plurality of regions.

10. The method of claim 5 wherein determining at least one potential region comprises:
checking each potential region of the plurality of potential regions associated with a current block to determine whether the defined level of data consistency is present; and wherein selecting the region from the at least one consistent potential region to include in the plurality of regions comprises:
selecting a largest potential region of the plurality of potential regions associated with the current block where the defined level of data consistency is present to include in the plurality of regions.

11. The method of claim 10 wherein the defined level of data consistency is present in a potential region of the plurality of potential regions associated with the current block when at least one of:
the potential region has no block with an end of block position greater than an end of block position threshold; or
the potential region has an error between edges between two adjacent blocks less than an error threshold.

12. The method of claim 11 wherein the end of block position threshold is three.

13. A method of decoding a compressed bitstream representing a video signal having a plurality of frames, each frame having a plurality of blocks, the method comprising:
identifying a residual for each region in a frame of the plurality of frames using a processor, each region including at least one block of the plurality of blocks, and a first region of the plurality of regions including a contiguous group of the plurality of blocks having a defined level of data consistency, wherein each residual has a same, first size, and each block of the plurality of blocks has a same block size;
identifying at least one region parameter associated with each residual, wherein the at least one region parameter includes an original size of each region;
determining a respective predictor for each region of the plurality of regions; and
decoding each region by combining the predictor and the residual for each region so as to form each region with its respective original size, wherein the first region has a second size larger than an original size of at least one other region of the plurality of regions.

14. The method of claim 13 wherein a size of the respective predictor is the original size of the region as defined by the at least one region parameter and decoding each region comprises:
scaling the residual from the first size to the original size of the region as defined by the at least one region parameter when the first size for the residual is not equal to the original size of the region; and
reconstructing the region by adding the scaled residual and the predictor.

15. The method of claim 13 wherein decoding each region comprises:
reconstructing the region from the residual and the predictor when at least one of the predictor or the residual is not equal to the original size of the region as defined by the at least one region parameter; and
scaling the reconstructed region to the original size of the region.

16. An apparatus for encoding a video signal having a plurality of frames, each frame having a plurality of blocks, the apparatus comprising:

a memory; and a processor configured to execute instructions stored in the memory to:

subdivide a frame of the plurality of frames into a plurality of regions, each region including at least one block of the plurality of blocks, and a first region of the plurality of regions composed of a contiguous group of the plurality of blocks having a defined level of data consistency; wherein the first region has a first size larger than a size of at least one other region of the plurality of regions and each block of the plurality of blocks has a same block size;

determine a respective predictor for each region of the plurality of regions;

generate a residual for each region using the respective predictor for each region; and encode each region by encoding the residual for each region, each residual having a same, second size smaller than the first size of the first region.

17. The apparatus of claim 16 wherein each block of a region of the plurality of regions, when transformed, has number of non-zero coefficients less than or equal to a threshold value; and wherein an edge error between values of pixels of adjacent blocks of the region is less than or equal to an edge error threshold.

18. The apparatus of claim 16 wherein the processor is configured to subdivide the frame by:

selecting an initial block;

checking an end of block position of the initial block;

defining the initial block as a region of the plurality of regions responsive to the end of block position being greater than an end of block position threshold;

defining the initial block as a potential region responsive to the end of block position being less than or equal to an end of block position threshold; and adding an additional block adjacent to the potential region to form a region of the plurality of regions unless at least one of:

the potential region has reached a maximum region size;

the additional block has an end of block position greater than the end of block position threshold; or a difference between pixels adjacent an edge between the at least one additional block and the potential region is greater than an edge error threshold.

19. The method of claim 1 wherein generating the residual comprises:

scaling the residual for each region larger than the second size from a respective original size to the second size to form a scaled residual; and wherein encoding the residual comprises encoding the scaled residual.

20. The method of claim 13 wherein each block of a region of the plurality of regions has an end of block position less than or equal to an end of block position threshold; and wherein an edge error between values of pixels of adjacent blocks of the region is less than or equal to an edge error threshold.

* * * * *

UNITED STATES PATENT AND TRADEMARK OFFICE
CERTIFICATE OF CORRECTION

Page 1 of 1

PATENT NO. : 8,594,189 B1
APPLICATION NO. : 13/081672
DATED : November 26, 2013
INVENTOR(S) : James Bankoski et al.

It is certified that error appears in the above-identified patent and that said Letters Patent is hereby corrected as shown below:

In the Claims

Column 13, Line 64; In Claim 9: "determining at least one" should be "determining the at least one".

Column 13, Line 65; In Claim 9: delete the words "has consistent data".

Column 13, Line 66; In Claim 9: delete the word "member".

Signed and Sealed this
Fifteenth Day of April, 2014

Michelle K. Lee
*Deputy Director of the United States Patent and Trademark Office*